United States Patent

[11] 3,587,142

| [72] | Inventor | Angelo Scaravelli<br>Milano, Italy |
|---|---|---|
| [21] | Appl. No. | 742,923 |
| [22] | Filed | July 5, 1968 |
| [45] | Patented | June 28, 1971 |
| [32] | Priority | July 24, 1967, Apr. 22, 1968 |
| [33] | | Italy |
| [31] | | 18724A/67 and 15579/A68 |

[54] DEVICE FOR TIGHTENING AND CLAMPING A HOSE CLAMP ON A TUBULAR BODY OR THE LIKE
10 Claims, 6 Drawing Figs.

[52] U.S. Cl. ............................................. 24/268, 24/269
[51] Int. Cl. ................................................ B65d 63/00
[50] Field of Search ......................................... 24/19, 20 (R); 285/252; 24/268, 269, 263 (SW)

[56] References Cited
UNITED STATES PATENTS

| 1,200,817 | 10/1916 | Curtin | 24/269 |
| 1,485,906 | 3/1924 | Bonham et al. | 24/263SWUX |
| 1,727,038 | 9/1929 | Rousey | 24/268 |
| 2,685,848 | 10/1954 | Meighan et al. | 24/263SWX |
| 2,685,849 | 10/1954 | Meighan et al. | 24/263SWX |

FOREIGN PATENTS

| 402,578 | 9/1924 | Germany | 24/269 |

Primary Examiner—Donald A. Griffin
Attorney—Steinberg and Blake

ABSTRACT: A device for tightening and clamping a hose clamp on a tubular body, the device comprising a rigid body having guides inclined to a bottom wall and a wedgelike slide movable on said guides. The two free ends of the hose clamp are inserted between the bottom wall and rigid body, one of which ends being grasped by a suitable tool and rotated to form a winding or coil abutting the slide and causing it to advance on the guides until the slide presses the band ends between it and the bottom wall of the rigid body by a sufficient force to firmly clamp the hose clamp.

PATENTED JUN28 1971 3,587,142

INVENTOR
ANGELO SCARNICCI
BY
Strasburg Blake
ATTORNEYS

DEVICE FOR TIGHTENING AND CLAMPING A HOSE CLAMP ON A TUBULAR BODY OR THE LIKE

This invention relates to a device for tightening and clamping a hose clamp on a tubular body or the like, particularly for tightening and clamping a flexible hose on a rigid tube.

Devices are known as comprising a metal rigid body carrying a screw freely rotatably supported on the body: such devices are for tightening and clamping a metal hose clamp having throughout its length a sequence of apertures engaged by the thread of the above-mentioned screw. Such devices show the major drawback of a substantially high cost.

Devices are also known for tightening onto a tube a flexible metal band having an even surface, that is without any cutouts, such devices comprising a metal body carrying a split pin, an end of said band being inserted between the arms of the split pin, whereas the other end of the band is secured to the rigid body. By rotating said split pin on the rigid body, the band is caused to be rolled up about the split pin and hence clamped on the rigid body on which it is rolled up. Such a latter type of devices have been widely used owing to the very low cost thereof as a result of their simple construction. However, such devices show substantial drawbacks, consisting, for example, of the end of the band rolled up about the split pin being only retained by mere friction, so that it would tend to unroll causing the band to slacken, which band cannot, accordingly, be tightened and clamped onto a tubular body by a large tension. A further drawback in such devices is in that they can be applied only on tubular bodies having a rather large diameter, generally greater than 15 mm., for less diameters being it required to roll up the band about the tubular body by a double turn, which will cause the advantages of the very low cost and ready application of the devices to be lost.

It is an object of the present invention to provide a device for tightening a hose clamp of any material on a tubular body or the like, which device is extremely inexpensive and suitable to firmly and reliably retain the hose clamp, even when the latter should experience very high tensions.

It is another object of the invention to provide a device which may be used for tightening a hose clamp on tubular bodies having also very small diameters.

A still further object of the invention is to provide a device for tightening a hose clamp on a tubular body or the like, and such as to firmly clamp said hose clamp after imparting thereto a tension of a predetermined rate.

Such a device is characterized by comprising a slide and a body having guide forming portions on which said slide is movable, said body has a bottom wall and side walls on which said guides are provided, said guides and slide are so formed that the movement of the slide on the body in a direction or in the opposite direction causes the slide to move to or, respectively, to move away from said bottom wall by a distance therefrom which is larger than the width of said hose clamp.

In order that the structure and features of the device be more clearly understood, two embodiments thereof will now be shown, by mere way of example and not of limitation, reference being made to the accompanying drawings in which.

Reference is first made to FIGS. 1—4, wherein an embodiment of the device is shown.

Figure 2:
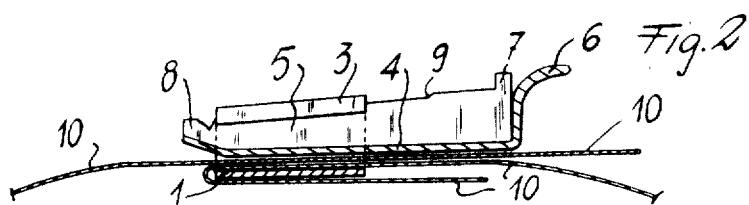
FIG. 2 is a longitudinal sectional view of the device at the conditions of FIG. 1.
Figure 4:
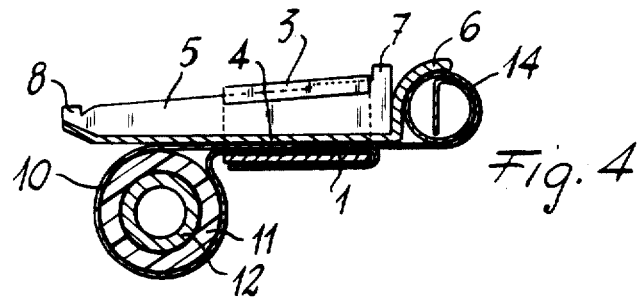
FIG. 4 is a longitudinal sectional view of the device at the conditions of FIG. 3, but applied to a tubular body having a small diameter.

As clearly seen, the device comprises a rigid body having a bottom wall 1 and sidewalls 2, the free ends of which are turned over to one another to form two guides 3 which are parallel to each other and inclined to wall 1, as particularly seen in FIGS. 2 and 4.

An integral slide is movable between walls 1 and 2 and guides 3 and comprises a bottom wall 4 and two sidewalls 5, the free edge of which is inclined to wall 4, so that said slide is substantially wedgelike shaped. Said slide also includes a wall 6 curved to the outside of the slide and projecting from that end of the slide which is wider than the other end, or projecting from that end of the slide the displacement of which to the inside of the rigid body causes wall 4 to move to wall 1.

Teeth 7 and 8, the latter being outwardly turned over, project from slide sidewalls 5 and serve for preventing the slide from slipping off of the rigid body on which it is movable.

Then, it can be seen that the free edge of the slide sidewalls 5 has a step 9 which projects and the function of which will be explained hereinafter.

Figure 1:
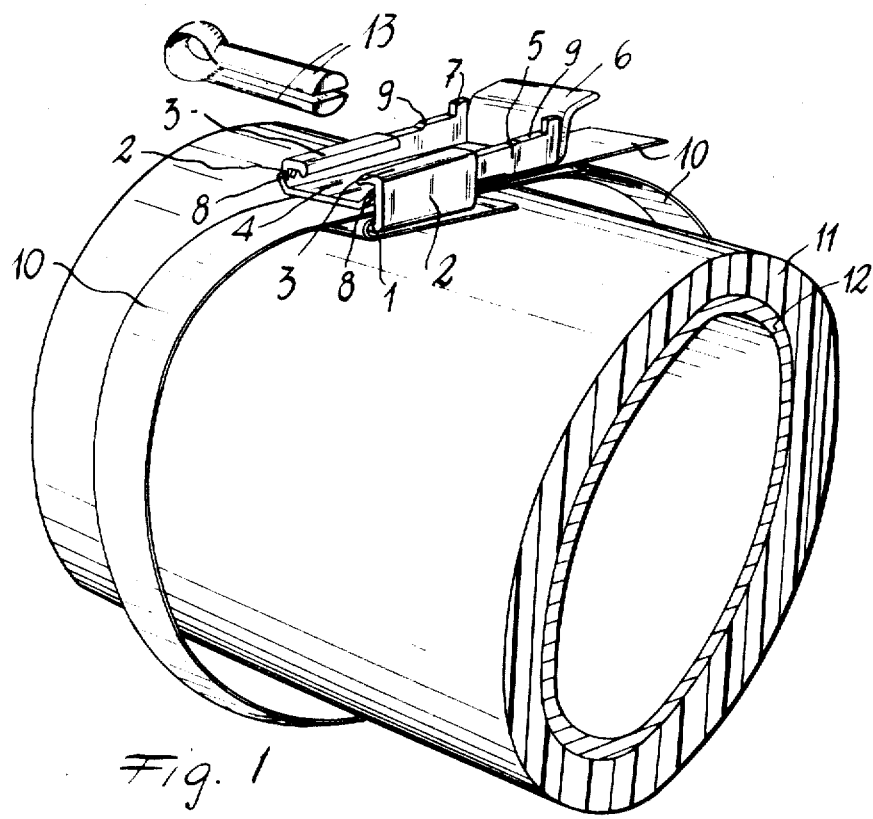
FIG. 1 is a perspective view of the device applied on a hose clamp as rolled up about a tubular body, the slide being shown at retracted position to the body forming part of the device.

When the slide is at retracted position with respect to the rigid body on which it is mounted, that is when at the position shown in FIGS. 1 and 2, there is between the bottom walls twice as much spacing as the width of band 10 which is designed to be tightened and clamped by the device.

Figure 3:
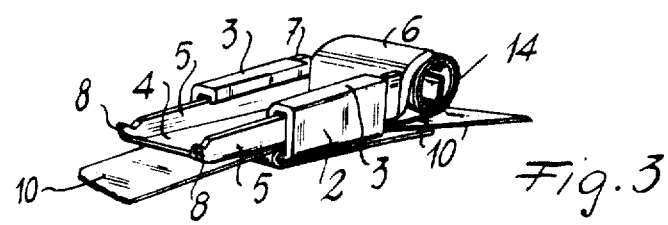
FIG. 3 is a perspective view of the device of FIGS. 1 and 2, but with the slide inserted in the device body for clamping a hose clamp, only the end portions of which are shown in the FIG.

When the slide moves onto the guides of the rigid body from position of FIGS. 1 and 2 to position of FIGS. 3 and 4, wall 4 will move closer and closer to wall 1.

The device, that is the slide and the rigid body on which said slide is movable, can e made of any suitable material, such as sheet metal, plastic material or the like.

Be it now assumed to desire to tighten and to clamp a hose clamp 10, either of metal or plastic material or even textile material, onto a yieldable tubular body 11 so as to clamp it on a rigid tubular body 12: in FIG. 1 said bodies 11 and 12 are shown as having a large diameter, whereas in FIG. 4 they are shown as having a small diameter, while being designated for simplicity by the same reference numerals 11 and 12. An end of hose clamp 10 is inserted between walls 1 and 4 of the device, which end is turned over below wall 1 (see FIGS. 1-3) in a direction, or in the opposite direction (see FIG. 4) depending on whether said hose clamp is to be tightened onto a tube having a large or a small diameter; the other end of the hose clamp is also passed through between said walls 1 and 4 to project beyond the curved wall 6 of the slide.

This hose clamp end projecting beyond wall 6 is inserted in the space between the arms 13 of a split pin shown in FIG. 1; thus, by rotation of the split pin, the band will be caused to roll up forming a winding or coil 14 (FIGS. 3 and 4) contacting the surface of said curved wall 6. When rotation of split pin is continued, band 10 will be tightened on the surface of tubular body 11, whereas winding or coil 14 will cause by abutting slide wall 6 said slide to be advanced inwardly of the rigid body, thus causing a gradual clamping effect on the two bands interposed between walls 1 and 4 of the device, this clamping effect being proportional to the tension as applied to the band by said split pin.

The projecting step 9 accomplishes the extremely important function of allowing the band to be firmly clamped only after imparting thereto a tension of a predetermined rate. Thus, after said slide has been advanced on band rolling up guides until the edge of step 9 contacts the ends of guides 3, the rolling up of the band onto the split pin can be continued and hence the tension of said band can be continuously increased without causing said slide to be further advanced on the guides, or without clamping the band between said walls 1 and 4 of the device until the tension being applied to the band exceeds a predetermined value, upon attainment of which said step 9 will insert below the corresponding guide (FIGS. 3 and 4) causing a sudden and substantial approaching of walls 1 and 4 and finally firmly clamping the band at the position and tension being attained.

When the band is clamped between walls 1 and 4 of the device, said split pin arms 13 can be slipped off of winding or coil 14 and said split pin can be reused.

Since band clamping occurs only by pressure being exerted on the two ends thereof by walls 1 and 4, said band need not to be necessarily made of metal, but can be made of any flexible material, as above stated.

The band rolling up to form said winding or coil 14 may be accomplished by any suitable tool, such as by elongated beak pliers rather than by said split pin.

As it may be seen from the figures of the drawing, there is no substantial solution of continuity in the band about the tubular body at the clamping device.

The band can be easily and readily released of the device, such as by hammering on the narrowest slide end to cause said slide to be retracted to the rigid body and hence said wall 4 to be moved away from wall 1.

Projecting step 9 of the slide can be conveniently formed of an internally hollow bulge or protuberance punched in sidewall 5, said bulge or protuberance collapsing at the time of imparting the predetermined tension to the band, that is at the time the band winding or coil applies a predetermined rate of bias to the slide.

The device as described can be made of plastic material, as hereinabove mentioned, and band 10 can also be made of plastic material, which is advantageous for some particular uses, such as where the device and band are to be used in contact with corrosive acids and in electrical and electronic applications wherein metal parts might cause drawbacks or disturbances due to electrical or magnetic effects.

Figure 5:
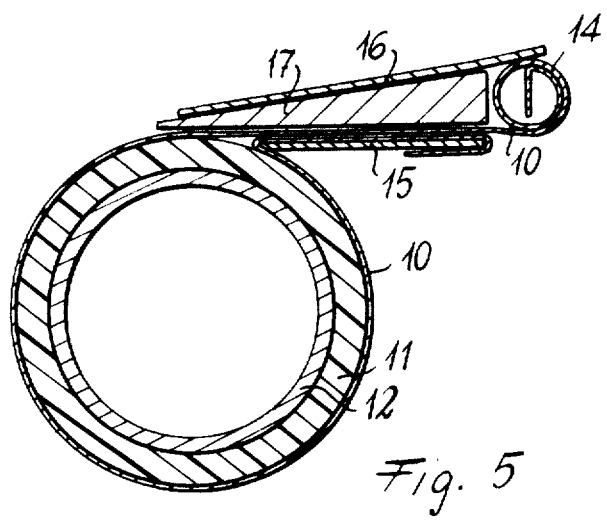
FIG. 5 is a schematic sectional view of a different embodiment of the device as used for tightening a hose clamp onto a tubular body having a large diameter.

A different embodiment of the device is shown in a schematic and longitudinal sectional view in FIG. 5, in which the device is shown as applied on a hose clamp 10 rolled about a flexible tubular body 11 overlapping a rigid tubular body 12. The device includes a rigid body comprising a bottom wall 15, two sidewalls (not shown), and a top wall 16 inclined to wall 15, as clearly noted in this figure, and longitudinally extending from side to side beyond said sidewalls and bottom wall. Walls 15 and 16 and the two sidewalls of the rigid body are integrally fast with one another and a wedge comprising slide 17 is accommodated therein. Wall 16 and sidewalls of the rigid body act as guides for the wedge and the ends of the top wall longitudinally extend beyond the ends of bottom wall 15 and sidewalls fast therewith, as apparent from the figure. One end of band 10 is turned over about bottom wall 15 and the other end of the and, after being passed over said one end of the band and below the wedge, is rolled up as herein described to form a winding or coil 14 abutting an end portion of wall 16 and the major base end of wedge 17 which, therefore, is forced to advance on the rigid body and hence to press on band 10 to wall 15. Thus, the band is tensioned and firmly clamped between wedge 17 and wall 15, in an entirely similar manner as herein described.

The device, as shown in FIG. 5, is particularly fit for band tightening and clamping on large diameter tubes.

Figure 6:
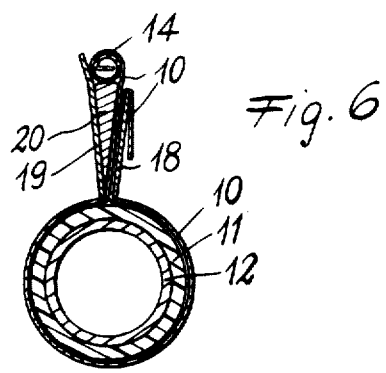
FIG. 6 is a still further embodiment of the device, shown in a sectional and schematic view, as used for tightening and clamping a clamp onto a tubular body having a small diameter.

In FIG. 6 there is shown a modified embodiment of the device of FIG. 5, as used for tightening a hose clamp 10 on a flexible tubular body 11 overlapping a rigid tubular body 12. The device is shown according to a schematic and longitudinal sectional view, and comprises a bottom wall 18 and a top wall 19 converging to one another and attached by sidewalls (not shown). A slide 20 is located between walls 18 and 19, said slide 20 comprising a wedge between which and said wall 18 the two ends of band 10 are passed, as clearly shown by the FIG. Wall 19 longitudinally extends beyond said sidewalls and bottom wall 18 of the rigid body only at the most widened portion of said rigid body to form an extension against which, as usual, the winding or coil 14 of band 10 abutting the wedgelike slide 20 is produced.

The device, as shown in FIG. 6, is particularly fit for band tightening and clamping on tubular bodies having a small diameter.

It will be readily appreciated from the disclosed embodiments that the device will afford according to some embodiments thereof to accomplish a gradual clamping onto a hose clamp through a blocking effect without releases and solution of continuity, or according to other embodiments a sudden blocking effect upon attainment of a predetermined tension in the band. Further, the device will afford to clamp and to secure hose clamps on tubular bodies from very large diameters to diameters as low as 3—4 mm. and substantially without any solution of continuity along the clamping surface of the band on the tubular body. The device also provides for a permanent use of a split pin as and tensioning member, since said split pin can be removed and reused after band blocking by the device. Further, it should be noted that the size of the device is minimized in its width dimension, said size being substantially the same as the band width, which allows the device to be applied also at particularly difficult access locations.

It is apparent from the above description and the drawings that with the structure of the invention there is a shiftable clamping slide which has a flat clamping surface of substantial area. An outer clamping body extends at least partly around the slide and has a transverse wall and a pair of sidewalls projecting from opposed ends of the transverse wall. FIGS. 4—6, for example, illustrate the transverse walls, 1, 15, and 18 of the several embodiments disclosed. The transverse wall of the clamping body has also a flat clamping surface of substantial area, and this latter flat clamping surface is directed toward the flat clamping surface of the clamping slide, these clamping surfaces defining between themselves a space for receiving portions of a clamping band 10. The sidewalls of the clamping body carry a guide means for guiding the shiftable clamping slide either in a clamping direction where the clamping surface of the slide approaches the flat clamping surface of the body while remaining parallel thereto so as to clamp portions of a band situated between these clamping surfaces, or in an opposite unclamping direction where the clamping surface of the side can be displaced away from the parallel clamping surface of the transverse wall of the clamping body. In the embodiment of FIGS. 1—4 this guide means takes the form of the inclined channels 3 at the edges of sidewalls 2, distant from transverse wall 1, these guide channels 3 receiving the side edges of the sidewalls 5 of the shiftable clamping slide of this embodiment. In the case of FIGS. 5 and 6, the walls 16 and 19 of these embodiments are carried by the sidewalls of the clamping body and engage the shiftable slide 17 in the case of FIG. 5 and 20 in the case of FIG. 6, so as to displace the flat clamping surface of the clamping slide toward the inner flat clamping surface of the transverse wall of the clamping body when the slide is shifted in one direction, namely the clamping direction, as referred to above. Of course, these slides 17 and 20 can be shifted in the opposite unclamping direction.

I claim:

1. A device for tightening and clamping a hose-clamping band on a tube or the like, comprising a shiftable clamping slide having a flat clamping surface of substantial area, a clamping body extending at least partly around said slide and having a transverse wall and a pair of side walls projecting respectively from opposed ends of said transverse wall, said slide being situated between said sidewalls and said transverse wall of said body having an inner flat clamping surface of substantial area directed toward said clamping surface of said slide, said clamping surfaces defining between themselves a space for receiving portions of a hose-clamping band, and guide means carried by said sidewalls of said clamping body and coacting with said slide for displacing said flat clamping surface of said slide towards said flat clamping surface of said body during shifting of said slide in a clamping direction while maintaining said clamping surfaces substantially parallel to each other, so that a hose-clamping band can extend substantially completely around a tube or the like while having portions situated next to each other, extending between said surfaces, with one band portion engaging said slide and the other engaging said body in a manner which urges said clamping surfaces more tightly toward each other in response to any tendency of the clamping band to loosen.

2. The combination of claim 1 and wherein said guide means is inclined with respect to said flat clamping surface of said body and said slide has inclined portions coacting with said guide means for displacing said clamping surface of said slide towards said clamping surface of said body when said slide is shifted in said clamping direction with respect to said body.

3. The combination of claim 2 and wherein said inclined surface of said slide has at least one projecting step for initially engaging said guide means to maintain said slide at a nonclamping position permitting easy displacement of a hose-clamping band through the space between said clamping surfaces, and for then abruptly advancing the clamping surfaces toward each other when the slide is shifted further in the clamping direction and the step engages the guide means.

4. The combination of claim 3 and wherein said slide has a wall curved outwardly from said slide at an end of the latter which approaches the interior of said body when said slide is displaced in the clamping direction, said curved wall having an exterior concave surface for accommodating a coiled portion of a hose-clamping band.

5. The combination of claim 1 and wherein said slide has at a surface which engages said guide means at least one projecting step for releasably holding said slide at a given nonclamping position until the hose-clamping band is properly positioned and for then abruptly advancing the clamping surface of the slide toward the clamping surface of the body through a given increment determined by the magnitude of said step upon shifting of the latter into engagement with said guide means.

6. The combination of claim 1 and wherein said slide has projections coacting with said body for preventing said slide from becoming fully separated from said body.

7. The combination of claim 1 and wherein said guide means takes the form of a second transverse wall extending between and carried by said sidewalls at ends of the latter distant from said first-named transverse wall with said second transverse wall being inclined with respect to said first-named transverse wall, and said slide having a wedge-shaped configuration to coact with said transverse wall of said guide means to be displaced toward the clamping surface of said body when said slide is shifted in the clamping direction.

8. The combination of claim 7 and wherein said second transverse wall projects at least at one end beyond said first-named transverse wall.

9. The combination of claim 7 and wherein said second transverse wall projects at both ends beyond said first-named transverse wall.

10. The combination of claim 1 and wherein said sidewalls of said body carry at free edges distant from said transverse wall of said body guide channels, the interiors of which are directed toward said transverse wall, and said slide having sidewalls provided with inclined free edges received in said channels with latter also being inclined for coacting with said slide for guiding the latter for movement toward said transverse wall of said body when said slide is shifted in the clamping direction.